United States Patent [19]

Arai et al.

[11] Patent Number: 5,087,683
[45] Date of Patent: Feb. 11, 1992

[54] PROCESS FOR PRODUCING α, ω-HYDROXYFLUOROALKYLPOLYSILOXANES

[75] Inventors: Masatoshi Arai; Shinichi Satoh; Kesao Ide, all of Annaka, Japan

[73] Assignee: Shin-Etsu Chemical Co. Ltd., Japan

[21] Appl. No.: 475,870

[22] Filed: Feb. 6, 1990

[30] Foreign Application Priority Data

Feb. 7, 1989 [JP] Japan ................................. 1-26782

[51] Int. Cl.$^5$ .............................................. C08G 77/06
[52] U.S. Cl. ........................................ 528/14; 528/18; 528/26; 556/462
[58] Field of Search ................ 528/26, 14, 18; 556/462

[56] References Cited

U.S. PATENT DOCUMENTS 3,997,496 12/1976 Razzano ............................. 528/14
4,028,338 7/1977 Razzano ............................. 528/14

Primary Examiner—Melvyn I. Marquis
Attorney, Agent, or Firm—Finnegan, Henderson, Farabow, Garrett & Dunner

[57] ABSTRACT

A process for producing an α, ω-hydroxyfluoroalkylpolysiloxane comprising polymerizing a cyclotrisiloxane in the presence of a polymerization catalyst of lithium hydroxide or a lithium salt of a diorganosiloxane, and a promoter of phtalic diorganoester and/or orthodialkoxybenzene, and stopping the polymerization by adding a neutralizer is disclosed. This process very easily obtains the α, ω-hydroxyfluoroalkylpolysiloxane of a desired viscosity.

If a chloroethane of the general formula CHX, CCl X$_2$ (X is the hydrogen or chlorine atom) is used as the neutralizer, the α, ω-hydroxyfluoroalkylpolysiloxane does not exhibit any substantial change of viscosity over time.

14 Claims, 1 Drawing Sheet

PROCESS FOR PRODUCING α, ω-HYDROXYFLUOROALKYLPOLYSILOXANES

BACKGROUND OF THE INVENTION

This invention relates to a process for producing an α, ω-hydroxyfluoroalkylpolysiloxane. More particularly, this invention relates to a process for producing an α, ω-hydroxyfluoroalkylpolysiloxane that easily controls the viscosity of an α, ω-hydroxyfluoroalkylpolysiloxane, and a process that enables the production of an α, ω-hydroxyfluoroalkylpolysiloxane that does not exhibit any substantial change of viscosity over time.

Conventionally, fluorosilicone compositions have been used as useful and valuable silicone fluids, since they can impart resistance to solvents and chemical, and repellency to otherwise conventional silicone compositions. A typical example of the fluorosilicone compositions is a silanol chain-stopped fluorosilicone composition, and a process for producing it is disclosed in U.S. Pat. No. 4,287,353. This process comprises the step of reacting 100 parts by weight of a methyltrifluoropropylsiloxane with a mixture of 0.005 to 0.1 parts by weight of a polymerization catalyst such as KOH or NaOH, 0.02 to 5.0 parts by weight of water, and 0.010 to 2.0 parts by weight of a polyethyleneglycol dimethyl ether as a promoter, and the step of adding a neutralizer such as hydrochloric acid or a silyl phosphate solution to obtain a fluorosilicone oil.

The '353 Patent discloses that the use of triethyleneglycol dimethyl eter, etc., as a promoter, lowers the polymerization initiation temperature, and shortens the polymerization time, and thereby decreases the amount of byproduct volatile siloxanes.

However, the process disclosed in the '353 U.S. Patent proceeds too rapidly to stop the polymerization at the desired viscosity. The more fatal defect is that the fluorosilicone oil exhibits a serious change of viscosity over time, and thus, it is impossible to store it stably for a long time.

Accordingly, it is a first object of the present invention to provide a process for producing a fluorosilicone oil that can lengthen the polymerization time while maintaining a low polymerization temperature during the polymerization period, and thereby enabling the easy production of a fluorosilicone oil having a desired viscosity.

An additional object of the present invention is to provide a process for producing a fluorosilicone oil that does not exhibit any substantial change of viscosity over time, and that can be stably stored for a long time without its viscosity being changing.

It has now been found by the inventors that the first object is attained by employing lithium hydroxide or a lithium salt of a diorganosiloxane obtained by blending and heating lithium hydroxide and a diorganosiloxane, as a polymerization catalyst, and a phthalic diorganoester and/or ortho-dialkoxybenzene, as a promoter.

It has now also been found by the inventors that the second object is attained by employing a chloroethane as a neutralizer to stop the polymerization reaction.

These and other objects of the present invention are accomplished by means of the disclosure set forth below.

SUMMARY OF THE INVENTION

A process for producing an α, ω-hydroxyfluoroalkylpolysiloxane comprising polymerizing a cyclotrisiloxane of general formula (I) in the presence of a polymerization catalyst of lithium hydroxide or a lithium salt of a diorganosiloxane obtained by blending and heating lithium hydroxide and a diorganosiloxane, and a promoter of a phthalic diorganoester and/or ortho-dialkoxybenzene, and then stopping the polymerization by adding an effective amount of a neutralizer at the desired viscosity:

wherein, $R^1$ is a substituted or unsubstituted monovalent hydrocarbon group having 1 to 8 carbon atoms, and $R^2$ is a fluoroalkyl group having 1 to 10 carbon atoms, preferably 1 to 6 carbon atoms.

By employing this process, the polymerization does not proceed so rapidly, and this, it is possible to control the viscosity of an α, ω-hydroxyfluoroalkylpolysiloxane.

As the above neutralizer, any neutralizer which can neutralize an alkaline reaction of the polymerization can be used to stop the polymerization reaction. However, if a chloroethane of the general formula $CHX_2,CCl X_2$, (X is a H or Cl atom) is used, 07 it is possible to produce an α, ω-hydroxyfluoroalkylpolysiloxane which does not exhibit any substantial change of viscosity over time.

The foregoing object, features, and advantages of the present invention will be apparent from the following description thereof.

DETAILED DESCRIPTION

Figure 1:
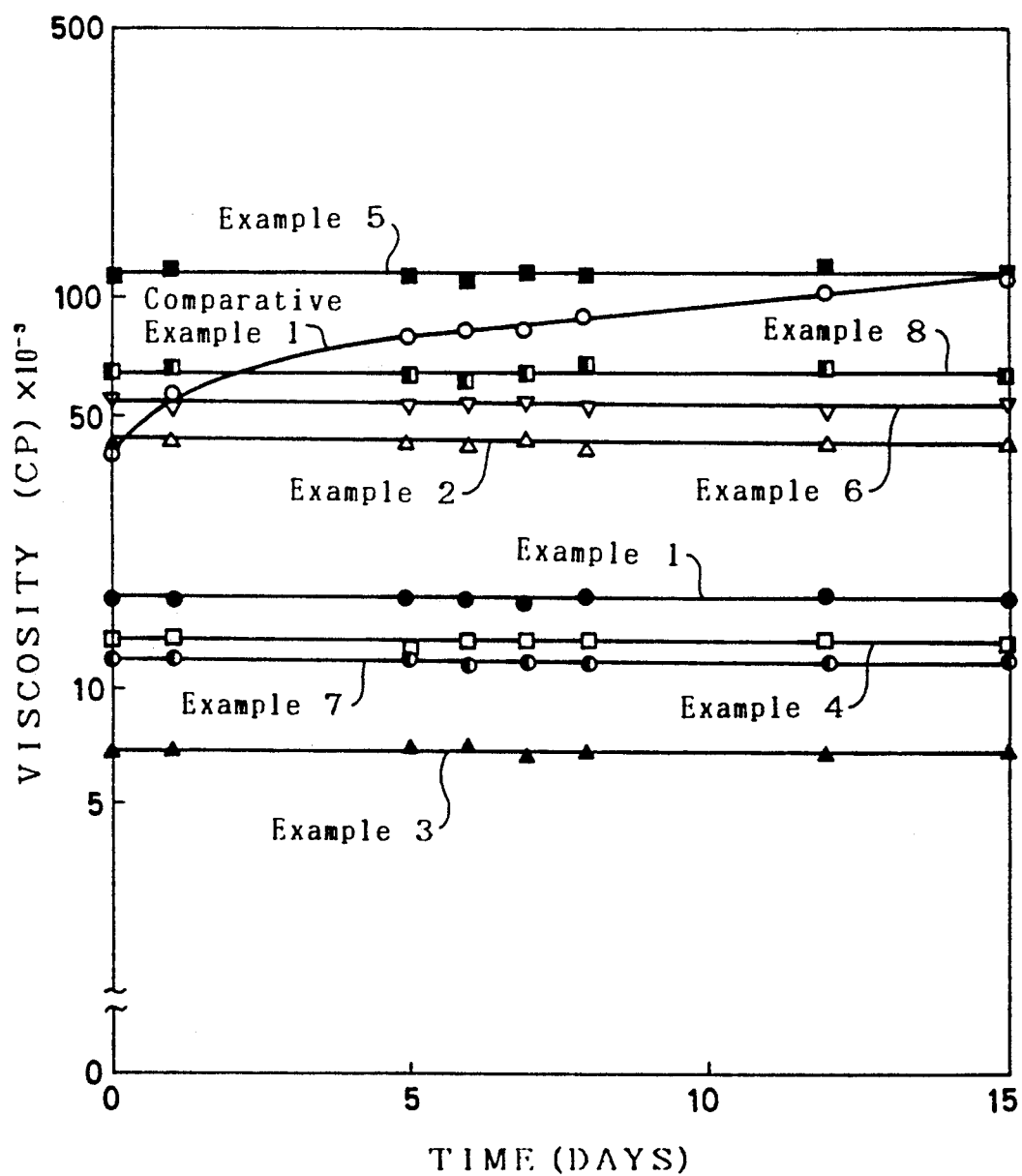
FIG. 1 is a diagrammatic representation of the change of viscosity over time of an α, ω-hydroxyfluoroalkylpolysiloxane obtained in the Examples and Comparative Example 1.

Examples of $R^1$ in the cyclotrisiloxane of general formula (I) include an alkyl group such as a methyl group, ethyl group, propyl group, or butyl group, a cycloalkyl group such as a cyclohexyl group, an aryl group such as a phenyl group, or a tolyl group. Further examples of $R^1$ include groups of which some or all hydrogen atoms in the above groups are substituted by a halogen atom or cyano group, such as a chloromethyl group, a 3,3,3-trifluoropropyl group, a 2-cyanoethyl group, etc. The preferable $R^1$ is a monovalent hydrocarbon group having 1 to 6 carbon atoms, and the most preferable $R^1$ is a group selected from methyl, vinyl, phenyl, and 3,3,3-trifluoropropyl groups.

Examples of $R^2$, in the cyclotrisiloxane of general formula (I) include a trifluoromethyl group, pentafluoroethyl group, a 3,3,3,-trifluoropropyl group, $C_4F_9CH_2,CH_2-$, and $C_8F_{17}CH_2,CH_2-$. The preferable $R^2$, is a fluoroalkyl group having 1 to 6 carbon atoms, and the most preferable $R^1$ is 3,3,3-trifluoropropyl group.

Examples of the cyclotrisiloxane in general formula (I) include cyclotrisiloxanes wherein $R^1$ and $R^2$, are each selected from the examples of $R^1$ and $R^2$, respectively, and 1,3,5-trimethyl-1,3,5-tris(3,3,3-trifluoropropyl)cyclotrisiloxane is an example of the cyclotrisiloxane.

Byproduct volatile cyclosiloxanes are generally produced in the polymerization of a fluoroalkylpolysiloxane containing silanol groups at its ends. In the present invention, lithium hydroxide, which is a weaker base than NaOH or KOH, or a lithium salt of a diorganosiloxane obtained by blending and heating lithium hydroxide and a diorganosiloxane, is used.

The amount of byproduct volatile cyclosiloxanes can also be decreased by conducting the polymerization reaction at a low temperature, because enough water can remain in the reaction system during the polymerization reaction, and the blocking with a hydroxyl group of the ends of the fluoroalkylpolysiloxane produced from the ring opening polymerization is sufficiently done. Since the viscosity of the thus-obtained fluoroalkylpolysiloxane partially depends on the amount of water remaining in the reaction system, the reaction temperature is preferably kept lower than the boiling point of water. Accordingly, in the present invention the polymerization reaction is preferably conducted at a temperature of from 40° C. to 95° C.

To compensate for the low polymerization reaction temperature, the use of a suitable promoter is necessary in the present invention. In the present invention, a phthalic diorganoester and/or ortho-alkoxybenzene shall be chosen as the promoter. Examples of the promoter to be used include dimethyl phthalate, diethyl phthalate, diallyl phthalate, orthodimethoxybenzene, and ortho-diethoxybenzene.

By the combination of the polymerization catalyst and the promoter, it is possible to appropriately promote the polymerization reaction, and it becomes possible to proceed with the polymerization reaction at a temperature of from 40° C. to 95° C., to decrease the amount of the byproduct volatile cyclosiloxanes, and to control the rate of the polymerization reaction and the viscosity of the products thus obtained.

The polymerization reaction is conducted under a basic condition, and thus it can be stopped by neutralizing the reaction system. However, if an acid compound is used as a neutralizer, an extra amount of the acid compound, which is not consumed in the neutralization, remains in the reaction system after the neutralization, and thus it is impossible to prohibit the condensation of the hydroxyl groups at the ends of the polysiloxanes after the polymerization reaction is stopped. Accordingly, it is impossible to avoid the increase over time of the viscosity of the thus-produced fluorosilicone oil. To avoid this problem, in the present invention a chloroethane of the general formula $CHX_2CCl\ X_2$, (X is a H or Cl atom) is used as a neutralizer. The most preferable chloroethane is 1,1,2,2-tetrachloroethane. If the chloroethane is added to the reaction system, the chloroethane undergoes a dehydrochlorination reaction to neutralize the basic components in the reaction system to the degree necessary to neutralize them. Thus, even if extra chloroethane remains in the reaction system after the neutralization is completed, no acid compounds which proceed the condensation of the hydroxyl groups at the ends of the polysiloxanes remain in the reaction system. Accordingly, the storage stability of the polysiloxanes is remarkably improved.

In a preferred embodiment a cyclotrisiloxane such as 1,3,5-trimethyl-1,3,5-tris(3,3,3-trifluoropropyl) cyclotrisiloxane is heated while it is stirred to an appropriate temperature, and lithium hydroxide (the polymerization catalyst) and dimethyl phtalate and/or ortho-dimethoxybenzene (the promoter) are added.

The amount of lithium hydroxide in the form of neat or salt of a diorganosiloxane is preferably 0.005 to 0.50 parts by weight, more preferably 0 05 to 0.15 parts by weight to 100 parts by weight of the cyclotrisiloxane. If the amount of the catalyst is less than 0.005 parts by weight, the polymerization reaction does not proceed well, even if a sufficient amount of the promoter is added. If the amount of the catalyst is more than 0.50 parts by weight, the polymerization reaction proceeds too rapidly, even without the addition of promoter, and it becomes difficult to stop the polymerization at a desired viscosity. The amount of the byproduct volatile cyclotrisiloxanes is also increased.

The amount of dimethyl phtalate and/or ortho-dialkoxybenzene is preferably 0.005 to 2.0 parts by weight, more preferably 0.005 to 0.20 parts by weight to 100 parts by weight of the cyclotrisiloxane.

The polymerization catalyst and the promoter are usually used with an appropriate organic solvent such as tetrahydrofuran, because this enables the rapid and uniform blending of the catalyst and the promoter with other components in the reaction system.

To increase catalytic activity, the lithium hydroxide catalyst is preferably used as a lithium salt of a diorganosiloxane obtained by blending and heating lithium hydroxide and a diorganosiloxane. The diorganosiloxane used for the preparation of the salt may contain any organic substituent groups. However, from the point of the purity of the polysiloxanes, an organosiloxane containing a fluoroalkyl group, especially a substituent group similar to $R^1$ and/or $R^3$, contained in general formula (I) is preferable. Examples of this diorganosiloxane include cyclotrisiloxane, cyclopentasiloxane, and cyclohexasiloxane, each of which contains organic substituent groups $R^1$ and $R^2$, Water is preferably added to the reaction system before a polymerization catalyst is added, so as to easily block the ends of the fluoroalkylpolysiloxane, which is produced from the ring opening polymerization, with hydroxyl groups.

The polymerization reaction is thus initiated, and stopped by adding a neutralizer such as the chloroethane of the general formula $CHX_2CCl\ X_2$ when the fluoropolysiloxane has a desired viscosity level. If necessary, volatile contents in the reaction system can be distilled off.

As stated above, by employing the combination of the lithium hydroxide catalyst and the phthalic diorganoester and/or ortho-alkoxybenzene promoter, it becomes possible to slow the polymerization reaction rate, and thus to obtain an $\alpha$, $\omega$-hydroxyfluoroalkylpolysiloxane having a desired viscosity.

It also becomes possible to remarkably improve the storage stability of the thus-produced fluorosilicone oil by employing the chloroethane of the general formula $CHX_2CCl\ X_2$.

The process of the present invention is illustrated in more detail by reference to the following examples. These examples, however, are illustrative only, and the claims are not to be construed as being limited by them. In the following examples, the term "volatility" refers to the measure of low molecular weight byproduct volatile cyclosiloxanes, and is measured as the percent weight loss when a sample is heated for 3 hours at 150° C.

EXAMPLE 1

500 g of 1,3,5-trimethyl-1,3,5-tris(3,3,3-trifluoropropyl)cyclotrisiloxane was charged to a reactor equipped with a stirrer. This fluid was heated with stirring to 65°, and 1.8 g of a mixture of an equal weight of $H_2O$ and tetrahydrofuran was added, and then mixed for 10 minutes. A polymerization reaction was initiated by adding a heated mixture of 0.4 g of methyltrifluoropropylpolysiloxanes containing 6% by weight of LiOH, 0.45 g of dimethyl phtalate, and 1.5 g of tetrahydrofuran. As the polymerization reaction progressed, the temperature of the reaction mixture gradually increased up to 80° C., and the viscosity also increased. The polymerization was continued for 5 hours, and thereafter stopped by adding, as a neutralizing agent, 3.4 g of 1,1,2,2-tetrachloroethane.

The reaction product had a viscosity of 17,000 cP at 25° C. and a volatility of 2.70%. The product was kept for 15 days at 70° C., but no change of viscosity over time was observed.

EXAMPLE 2

500 g of 1,3,5-trimethyl-1,3,5-tris(3,3,3-trifluoropropyl)cyclotrisiloxane was charged to a reactor equipped with a stirrer. This fluid was heated with stirring to 65° C. and 1.6 g of a mixture of an equal weight of $H_2O$ and tetrahydrofuran was added, and then mixed for 10 minutes. A polymerization reaction was initiated by adding a heated mixture of 0.4 g of silicones containing 6% by weight of LiOH, 0.45 g of dimethyl phtalate, and 1.5 g of tetrahydrofuran. As the polymerization reaction progressed, the temperature of the reaction mixture gradually increased up to 80° C., and the viscosity also increased. The polymerization was continued for 5 hours, and thereafter stopped by adding, as a neutralizing agent, 3.4 g of 1,1,2,2-tetrachloroethane.

The reaction product had a viscosity of 41,000 cP at 25° C. and a volatility of 2.24%. The product was kept for 15 days at 70° C., but no change of viscosity over time was observed.

EXAMPLE 3

500 g of 1,3,5-trimethyl-1,3,5-tris(3,3,3-trifluoropropyl)cyclotrisiloxane was charged to a reactor equipped with a stirrer. This fluid was heated with stirring to 80 ° C., and then 2 g of a mixture of an equal weight of $H_2O$ and tetrahydrofuran was added, and then mixed for 10 minutes. The polymerization was initiated by adding a mixture of 0.4 g of silicones containing 6% by weight of LiOH, 0.45 g of dimethyl phtalate, and 1.5 g of tetrahydrofuran. As the polymerization reaction progressed, the temperature of the reaction mixture gradually increased up to 80 and the viscosity also increased. The polymerization was continued for 5 hours.

The reaction product had a viscosity of 7,000 cP at 25° C.,.and a volatility of 4.48%. The reaction product was kept for 15 days at 70 but no change of viscosity over time was observed.

EXAMPLE 4

500 g of 1,3,5-trimethyl-1,3,5-tris(3,3,3-trifluoropropyl)cyclotrisiloxane was charged to a reactor equipped with a stirrer. This fluid was heated with stirring to 60 and 1.6 g of a mixture of an equal weight of $H_2O$ and tetrahydrofuran was added, and then mixed for 10 minutes. The polymerization was initiated by adding a mixture of 0.4 g of silicones containing 6% by weight of LiOH, 0.5 g of diallyl phtalate, and 1.5 g of tetrahydrofuran. As the polymerization progressed, the temperature of the reaction mixture gradually increased up to 70 and the viscosity also increased. The polymerization was continued for 5 hours, and thereafter stopped by adding, as a neutralizing agent, 3.4 g of 1,1,2,2-tetrachloroethane.

The reaction product had a viscosity of 13,250 cP and a volatility of 2.80%. The reaction product was kept for 15 days at 70° C., but no change of viscosity over time was observed.

EXAMPLE 5

500 g of 1,3,5-trimethyl-1,3,5-tris(3,3,3trifluoropropyl)cyclotrisiloxane was charged to a reactor equipped with a stirrer. This fluid was heated with stirring to 80 and 0.8 g of a mixture of an equal weight of $H_2O$ and tetrahydrofuran was added, and then mixed for 10 minutes. The polymerization was initiated by adding a mixture of 0.5 g of silicones containing 6% by weight of LiOH, 0.5 g of dimethyl phtalate, and 1.5 g of tetrahydrofuran. As the polymerization progressed, the temperature of the reaction mixture gradually increased up to 95° C., and the viscosity also increased. The polymerization was continued for 6 hours, and thereafter stopped by adding, as a neutralizing agent, 3.4 g of 1,1,2,2-tetrachloroethane.

The reaction product had a viscosity of 112,500 cP at 25° C., and a volatility of 1.80%. The product was kept for 15 days at 70° C., but no change of viscosity over time was observed.

EXAMPLE 6

500 g of 1,3,5-trimethyl-1,3,5-tris(3,3,3-trifluoropropyl)cyclotrisiloxane was charged to a reactor equipped with a stirrer, and was heated with stirring to 80° C. 0.8 g of a mixture of an equal weight of $H_2O$ and tetrahydrofuran was added, and then mixed for 10 minutes. The polymerization was initiated by adding a mixture of 0.4 g of silicones containing 6% by weight of LiOH, 0.3 g of ortho-dimethoxybenzene, and 1.5 g of tetrahydrofuran. As the polymerization progressed, the temperature of the reaction mixture gradually increased up to 90° C. and the viscosity also increased. The polymerization was continued for 6 hours, and stopped by adding, as a neutralizing agent, 3.4 g of 1,1,2,2-tetrachloroethane.

The reaction product had a viscosity of 51,000 cP at 25° C. and a volatility of 2.19%. The product was kept for 15 days, but no change of viscosity over time was observed.

EXAMPLE 7

2000 g of 1,3,5-trimethyl-1,3,5-tris(3,3,3-trifluoropropyl)cyclotrisiloxane was charged to a reactor equipped with a stirrer. This fluid was heated with stirring to 75° C. and 6.4 g of a mixture of an equal weight of $H_2O$ and tetrahydrofuran was further added, and then mixed for 10 minutes. The polymerization was initiated by adding a mixture of 0.1 g of LiOH, 2.0 g of dibutyl phtalate, and 6.0 g of tetrahydrofuran. As the polymerization progressed, the temperature of the reaction mixture gradually increased up to 85° C., and the viscosity also increased. The polymerization was continued for 5 hours, and stopped by adding, as a neutralizing agent, 15.0 g of 1,1,2,2-tetrachloroethane.

The reaction product had a viscosity of 12,100 cP at 25° C. and a volatility of 3.2%. The product was kept for 15 days at 70° C., but no change of viscosity over time was observed.

EXAMPLE 8

2000 g of 1,3,5-trimethyl-1,3,5-tris(3,3,3-trifluoropropyl)cyclotrisiloxane was charged to a reactor equipped with a stirrer. This fluid was heated with stirring to 90° C. and 3.2 g of a mixture of an equal weight of H₂O and tetrahydrofuran was added, and then mixed for 10 minutes. The polymerization was initiated by adding a mixture of 0.15 g of LiOH, 1.5 g of ortho-diethoxybenzene, and 6.0 g of tetrahydrofuran. As the polymerization progressed, the temperature of the reaction mixture gradually increased up to 95 and the viscosity also increased. The polymerization was continued for 6 hours, and stopped by adding, as a neutralizing agent, 20.0 g of 1,1,2,2-pentachloroethane.

The reaction product had a viscosity of 62,000 cP at 25° C. and a volatility of 4.0%. The product was kept for 15 days, but no change of viscosity over time was observed.

COMPARATIVE EXAMPLE 1

This comparative example was conducted based on the process of U.S. Pat. No. 4,287,353, is compared with the process of the present invention.

500 g of 1,3,5-trimethyl-1,3,5-tris(3,3,3-trifluoropropyl)cyclotrisiloxane was charged to a reactor equipped with a stirrer. This fluid was heated with stirring to 42° C. and 1.8 g of a mixture of an equal weight of H₂O and tetrahydrofuran was added, and then mixed for 10 minutes. A ring opening polymerization was initiated by adding a mixture of 0.4 g of methyltrifluoropropylpolysiloxanes containing 10% by weight of NaOH, 0.35 g of triethyleneglycol dimethyl ether, and 1.5 g of tetrahydrofuran.

As the polymerization progressed, the temperature of the reaction mixture reached 42° C. to 51° C., and the viscosity also gradually increased. The polymerization was continued for 1 hour, and thereafter stopped by adding, as a neutralizing agent, 1 g of carboxylic acid.

The reaction product had a viscosity of 39,000 cP at 25° C. and a volatility of 8.3%. The product was kept for 15 days at 70° C., and viscosity increased up to about 110,000 cP. The product was very poor in stability during the storage.

COMPARATIVE EXAMPLE 2

500 g of 1,3,5-trimethyl-1,3,5-tris(3,3,3-trifluoropropyl)cyclotrisiloxane was charged to a reactor equipped with a stirrer. This fluid was heated with stirring to 75° C. and 1.8 g of a mixture of an equal weight of H₂O and tetrahydrofuran was added. Then a mixture of 0.8 g of methyltrifluoropropylpolysiloxanes containing 10% by weight of NaOH, and 1.5 g of tetrahydrofuran, was further added, and mixed for 10 hours at 75° C. but no increase in its viscosity was observed. The temperature was gradually increased with stirring, and the polymerization initiated at 120° C. The polymerization was continued for 1 hour, and stopped by adding, as a neutralizing agent, 1.0 g of carboxylic acid. The reaction product had a viscosity of 101,000 cP at 25° C., and a volatility of 18.5%.

The results in the Examples and the Comparative Examples clearly show that the process of the present invention is very excellent in controlling the rate of the polymerization reaction and the viscosity of the product.

The results in the change in viscosity over time obtained in the Examples and Comparative Example 1 are summarized in FIG. 1. FIG. 1 clearly shows that the use of the chloroethane as a neutralizer in the present invention can produce products that exhibit excellent storage stability.

We claim:

1. A process for producing an α, ω-hydroxyfluoroalkylpolysiloxane comprising polymerizing a cyclotrisiloxane of formula (I) in the presence of a polymerization catalyst of lithium hydroxide or a lithium salt of a diorganosiloxane obtained by blending and heating lithium hydroxide and a diorganosiloxane, and a promoter of a phthalic diorganoester and/or ortho-dialkoxybenzene, and adding an effective amount of a neutralizer to stop the polymerization reaction at the desired viscosity:

wherein
$R^1$ is a substituted or unsubstituted monovalent hydrocarbon group having 1 to 8 carbon atoms;
$R^2$ is a fluoroalkyl group having 1 to 10 carbon atoms.

2. A process as in claim 1, wherein $R^1$ is methyl, vinyl, phenyl, or 3,3,3-trifluoropropyl group.

3. A process as in claim 1, wherein $R^2$, is trifluoromethyl group, pentafluoroethyl group, 3,3,3-trifluoropropyl group, $C_4F_9CH_2CH_2$-, or $C_8F_{17}CH_2CH_2$-.

4. A process as in claim 1, wherein said cyclotrisiloxane is 1,3,5-trimethyl-1,3,5-tris (3,3,3-trifluoropropyl)-cyclotrisiloxane.

5. A process as in claim 1, wherein said promoter is dimethyl phthalate, diethyl phthalate, diallyl phthalate, ortho-dimethoxybenzene, or orthodiethoxybenzene.

6. A process as in claim 1, 2, 3, 4, or 5, wherein said neutralizer is a chloroethane of the general formula:

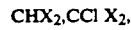

wherein X is a hydrogen or chlorine atom.

7. A process as in claim 6, wherein said chloroethane is 1,1,2,2-tetrachloroethane.

8. A process as in claim 1, wherein the amount of lithium hydroxide in the form of salt of a diorganosiloxane is 0.005 to 0.50 parts by weight to 100 parts by weight of said cyclotrisiloxane.

9. A process as in claim 1, wherein the amount of dimethyl phthalate and/or ortho-dialkoxybenzene is 0.005 to 2.0 parts by weight to 100 parts by weight of said cyclotrisiloxane.

10. A process as in claim 1, wherein said polymerization catalyst and said promoter is used with tetrahydrofuran.

11. A process as in claim 1, wherein said diorganosiloxane used for preparing a lithium salt is a cyclotrisiloxane, cyclopentasiloxane, or cyclohexasiloxane containing said $R^1$ and $R^2$ groups in general formula (I).

12. A process as in claim 1, wherein the polymerization is conducted at 45° C. to 95° C.

13. A process as in claim 1, wherein H₂O is further added to the reaction system before adding said polymerization catalyst.

14. A process as in claim 1, wherein $R^1$ is selected from alkyl, alkenyl, cycloalkyl, aryl, chloromethyl, 3,3,3-trifluoropropyl and 2-cyano ethyl groups.

* * * * *